US010033639B2

(12) United States Patent
Garcia-Luna-Aceves

(10) Patent No.: US 10,033,639 B2
(45) Date of Patent: Jul. 24, 2018

(54) SYSTEM AND METHOD FOR ROUTING PACKETS IN A CONTENT CENTRIC NETWORK USING ANONYMOUS DATAGRAMS

(71) Applicant: CISCO TECHNOLOGY, INC., San Jose, CA (US)

(72) Inventor: Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 15/081,776

(22) Filed: Mar. 25, 2016

(65) Prior Publication Data

US 2017/0279716 A1    Sep. 28, 2017

(51) Int. Cl.
| | | |
|---|---|---|
| H04L 12/741 | (2013.01) | |
| H04L 12/755 | (2013.01) | |
| H04L 29/06 | (2006.01) | |

(52) U.S. Cl.
CPC .......... *H04L 45/745* (2013.01); *H04L 45/021* (2013.01); *H04L 65/4076* (2013.01)

(58) Field of Classification Search
CPC .. H04L 45/745; H04L 65/4076; H04L 45/021
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |
| 4,921,898 | A | 5/1990 | Lenney |
| (Continued) | | | |

FOREIGN PATENT DOCUMENTS

| | | |
|---|---|---|
| DE | 1720277 A1 | 6/1967 |
| DE | 19620817 A1 | 11/1997 |
| (Continued) | | |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Andrew Lai
*Assistant Examiner* — Harry H Kim

(57) ABSTRACT

A router of a content centric network (CCN) can forward messages using anonymous identifiers. The router can receive an Interest via a first interface, and determines a first anonymous identifier (AID) that identifies a name-independent path to the Interest's source via the router. The router can identify a second interface for forwarding the Interest to a next-hop neighbor via CCN, and performs a bijective function on the first AID to obtain a second AID that is to be used by the next-hop neighbor to return a corresponding data packet to the router. The router updates the Interest to include the second AID, and forwards the Interest via the second interface toward the next-hop neighbor. When the router receives the data packet, the router performs a lookup operation in an anonymous routing table (ART), based on the AID, to determine an interface for forwarding the data packet toward the Interest's source.

23 Claims, 8 Drawing Sheets

(56) References Cited

U.S. PATENT DOCUMENTS

| | | |
|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,936,753 B1 * | 5/2011 | Colloff ............... H04L 12/1868 370/390 |
| 7,953,014 B2 | 5/2011 | Toda |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,071,498 B2 | 6/2015 | Beser |
| 9,112,895 B1 | 8/2015 | Lin |
| 9,253,087 B2 * | 2/2016 | Zhang ................... H04L 45/74 |
| 9,280,610 B2 | 3/2016 | Gruber |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |

(56) References Cited

U.S. PATENT DOCUMENTS

| | | |
|---|---|---|
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0276396 A1 | 11/2009 | Gorman |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |

(56) References Cited

U.S. PATENT DOCUMENTS

| | | |
|---|---|---|
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |

(56) References Cited

U.S. PATENT DOCUMENTS

| | | |
|---|---|---|
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1* | 9/2014 | Solis ............ H04L 67/327 709/204 |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan et al. |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2017/0093752 A1* | 3/2017 | Mohaisen ............ H04L 47/808 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography—About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.

(56) References Cited

OTHER PUBLICATIONS

D. Boneh and M. Franklin. Identity-Based Encryption from the Weil Pairing. Advances in Cryptology—CRYPTO 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

Anteniese et al., "Improved Proxy Re-Encryption Schemes with Applications to Secure Distributed Storage", 2006.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Xiong et al., "CloudSeal: End-to-End Content Protection in Cloud-based Storage and Delivery Services", 2012.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Sciencevol. 5443 (2009).

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

Gopal et al. "Integrating content-based Mechanisms with hierarchical File systems", Feb 1999, University of Arizona, 15 pages.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

(56) References Cited

OTHER PUBLICATIONS

M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.

(56) References Cited

OTHER PUBLICATIONS

Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
International Search Report and Written Opinion in corresponding International Application No. PCT/US2017/032892, dated Jun. 2, 2017, 11 pgs.
Garcia-Luna-Aceves, et al., "New Directions in Content Centric Networking", 2015 IEEE 12th International Conference on Mobile Ad Hoc and Sensor Systems, IEEE, XP032845708, DOI: 10.1109/MASS.2015.86, Oct. 19, 2015, 6 pgs.

\* cited by examiner

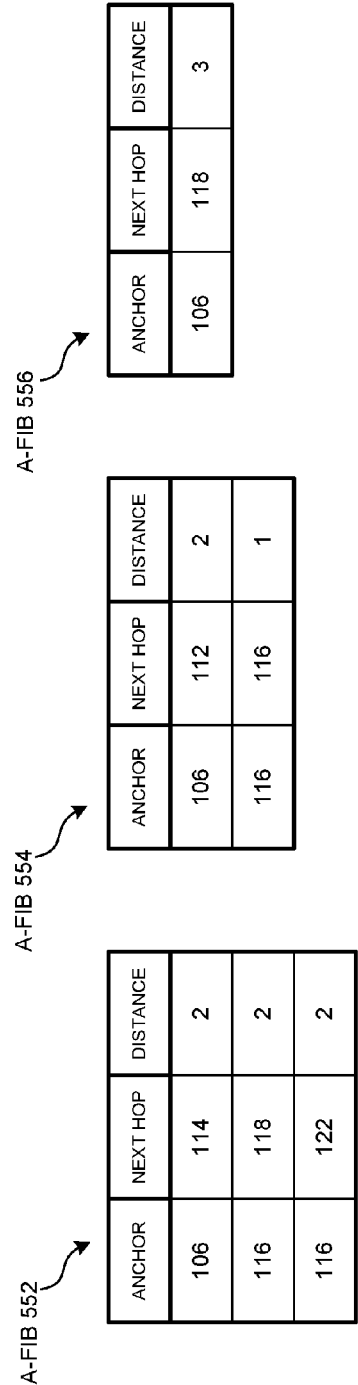

SYSTEM AND METHOD FOR ROUTING PACKETS IN A CONTENT CENTRIC NETWORK USING ANONYMOUS DATAGRAMS

BACKGROUND

Field

This disclosure is generally related to a content centric network (CCN). More specifically, this disclosure is related to using anonymous datagrams for routing CCN packets.

Related Art

The proliferation of the Internet and e-commerce continues to fuel revolutionary changes in the network industry. Today, a significant number of information exchanges, from online movie streaming to daily news delivery, retail sales, and instant messaging, are conducted online. An increasing number of Internet applications are also becoming mobile. However, the current Internet operates on a largely location-based addressing scheme. The most ubiquitous protocol, the Internet Protocol (IP), is based on location-based address. That is, a consumer of content can only receive the content by explicitly requesting the content from an address (e.g., IP address) closely associated with a physical object or location. A request that has a URL with an IP address for a specific organization causes the request to go to that organization's servers and not to those of another organization.

Recently, content centric networking (CCN) architectures have been proposed in the industry. CCN brings a new approach to content transport. Instead of having network traffic viewed at the application level as end-to-end connections over which content travels, content is requested or returned based on its unique location-independent name, and the network is responsible for routing content from the provider to the consumer.

With content centric networks, there are generally two types of CCN messages: Interests and Content Objects. An Interest message includes a name for a Content Object, and a client can disseminate the Interest over CCN to obtain the Content Object from any CCN node that hosts the Content Object. The Interest is forwarded toward a CCN node that advertises at least a prefix of the Interest's name. If this CCN node can provide the Content Object, this node can return the Content Object (along the Interest's reverse path) to satisfy the Interest.

The CCN nodes generally use a forwarding information base (FIB) and a pending interest table (PIT) to map name prefixes to a neighbor via which the named content can be obtained. However, the FIB can become substantially large as the number of content producers grows across CCN, which may slow the lookup times at each node along a path between a content consumer and a content producer.

To make matters worse, the size of a node's PIT can increase in proportion to the number of pending Interests at the node. This may allow malicious entities to perform an Interest-flooding attack that virtually disables CCN forwarder nodes by flooding their PITs with erroneous Interests.

SUMMARY

One embodiment provides a packet-forwarding system that facilitates routing information centric networking (ICN) Interests using anonymous identifiers. During operation, a router can receive an Interest via a first interface of the router, and determines, for the Interest, a first anonymous identifier (AID) that identifies a name-independent path to the Interest's source via the router. The router can identify a second interface for forwarding the Interest to a next-hop neighbor via ICN, and performs a bijective function on the first AID to obtain a second AID that is to be used by the next-hop neighbor to establish a name-independent return path to the router. The router may then update the Interest to include the second AID, and may forward the Interest via the second interface toward the next-hop neighbor.

In information centric networks (ICN), each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in an CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server)

or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, while determining the first AID, the router may select a default AID associated with the router as the first AID in response to determining that the Interest does not include an AID.

In some embodiments, while determining the first AID, the router may obtain an AID from the Interest.

In some variations on these embodiments, while determining the first AID, the router may select for the Interest, an AID that the router has not assigned to an interface different than the first interface, in response to determining that the router has mapped the Interest's AID to a third interface different than the first interface, selecting.

In some embodiments, the router may update an anonymous routing table (ART) to include an ART entry that maps the first AID to the first interface, if the ART entry does not exist in the ART.

In some variations on these embodiments, while updating the ART, the router may create the ART entry so that the ART entry maps the first AID to an AID specified in the original Interest.

In some embodiments, if the router determines that the Interest corresponds to a multicast stream, the router may update a multicast anonymous routing table (MART) to include a MART entry that maps a group identifier and the AID to at least the first interface, if the mapping does not exist in the MART.

In some variations on these embodiments, the Interest can include a multicast counter which identifies a starting sequence number for the multicast stream. Also, while updating the MART, the router may store the multicast counter in the MART entry.

In some embodiments, while performing the bijective function, the router may determine, from an ordered AID list corresponding to the next-hop neighbor, the second AID that corresponds to the first AID in a local ordered AID list for the router.

One embodiment provides a packet-forwarding system that facilitates routing ICN data packets using anonymous identifiers. During operation, a router may receive an ICN data packet that includes a response to a pending Interest. The router may obtain, from the ICN data packet, an anonymous identifier (AID) that identifies a name-independent path to the Interest's source via the router. The router may then perform a lookup operation in an anonymous routing table (ART), based on the AID, to determine an interface of the router for forwarding the ICN data packet toward the pending Interest's source. The router may update the ICN data packet to include an AID used by the next-hop neighbor for the pending Interest, and may forward the ICN data packet via the interface.

In some embodiments, while updating the ICN data packet, the router may obtain, from the ART, an ART entry that maps the ICN data packet's AID to an original AID of the pending Interest.

In some variations on these embodiments, while updating the ICN data packet, the router may perform a bijective function on the original AID to determine the AID used by the next-hop neighbor for the pending Interest.

In some embodiments, the ART may be a multicast anonymous routing table (MART), with a MART entry that maps the AID and a multicast group identifier of the ICN data packet to one or more next-hop neighbors of a multicast tree that are to receive the ICN data packet.

In some variations on these embodiments, the MART entry may include a multicast counter which identifies a sequence number for a next ICN data packet that the next-hop neighbors are to receive via the multicast tree. Moreover, the router may increment the multicast counter in the MART in response to forwarding the ICN data packet.

BRIEF DESCRIPTION OF THE FIGURES

FIG. 5A illustrates exemplary name-prefix forwarding information base (NP-FIB) tables in accordance with an embodiment.

FIG. 5B illustrates exemplary anchor forwarding information base (A-FIB) tables in accordance with an embodiment.

In the figures, like reference numerals refer to the same figure elements.

DETAILED DESCRIPTION

Figure 1:
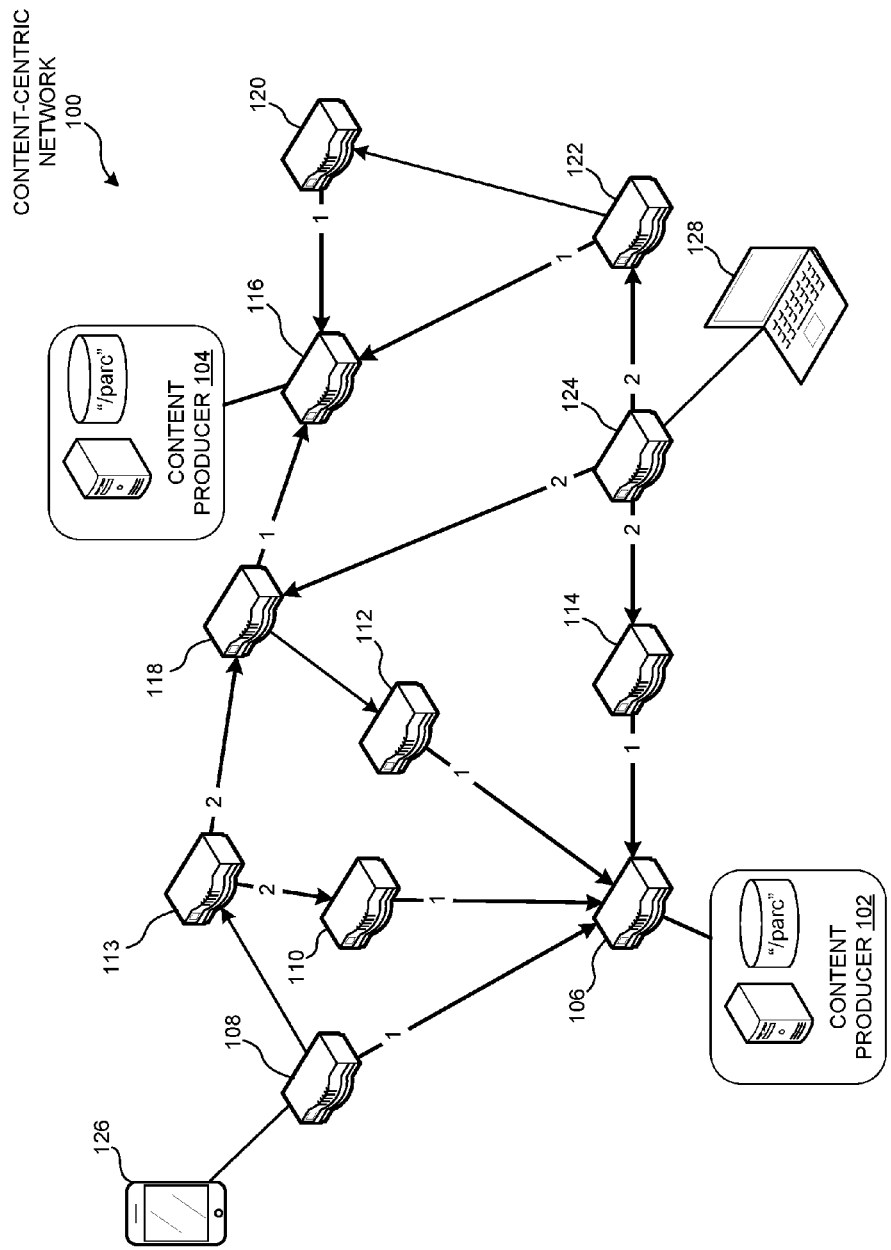
FIG. 1 illustrates an exemplary content-centric network in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a packet-forwarding system that can use anonymous datagrams to establish name-independent unicast and multicast routes in an information-centric network (ICN), such as a content-centric network (CCN). CCN routers can use anonymous identifiers to establish a path to a content consumer, without having to store a per-Interest forwarding state to the consumer, and without having to store a global identifier for the consumer.

In some embodiments, a CCN Interest can specify a name for content, an anonymous identifier (AID), and a distance to a nearest content provider associated with a name prefix. Routers can use the AID to establish a path to the requester that disseminated the Interest, and can use the distance value to avoid establishing forwarding loops. The router can determine the distance based on a routing protocol in the control plane that populates the node's forwarding information base (FIB), and in some embodiments, may include the distance value in the FIB along with the name prefix.

Routers use can establish anonymous return paths without storing a per-Interest forwarding state by having each router along a path give its neighbors an AID to use when responding with a Content Object. This AID does not need to be globally unique across the network, and can vary between neighboring nodes along the return path. The AID only needs to be unique between the two neighbors (locally unique) for a path, and does not reveal information about the network clients from where the Interest originated. For example, if a router sees an AID value of 15, the router will not know whether the previous hop was the origin of the Interest or a relay for the Interest. However, the router can use the AID for performing a lookup operation in a local anonymous routing table (ART) to determine which neighbor has requested the Content Object.

Hence, the AID is only used for the purposes of forwarding a matching Content Object to the previous hop from where the Interest originated, but does not have a fixed association with a source of the Interest. The caching sites, relays, or the content producers will not know who asked for the content. Using the AID to establish a path to a consumer allows the forwarding operations to remain localized at each router along the path. If multiple consumers disseminate Interests to request the same content, each router only needs to keep track of the local neighbors that can be used to forward a Content Object with a given AID value; the local router does not need to keep track of all entities that have requested the content, and does not need to keep track of the Interests that have been received from these entities.

System Architecture

FIG. 1 illustrates an exemplary content-centric network 100 in accordance with an embodiment. CCN 100 can include content producers 102 and 104 for a name prefix "/parc." Content producer 102 can be accessed via a CCN router 106, and content producer 104 can be accessed via router 116. Routers 106 and 116 are hereinafter referred to as "anchors" for name prefix "/parc," as they are next-hop neighbors to content producers for the name prefix "/parc."

Routers across CCN 100 can populate a name-prefix FIB (NP-FIB) that maps a name prefix to an anchor identifier for a nearest anchor for the name prefix, and an interface toward the nearest anchor. The routers can also populate an anchor FIB (A-FIB) that maps each anchor identifier to a next-hop neighbor toward the anchor. For example, routers 106, 108, 110, 112, and 114 may create an NP-FIB entry which designates node 106 as the nearest anchor for the name prefix "/parc." Also, routers 118, 120, and 122 may create an NP-FIB entry which designates router 116 as the nearest anchor for the name prefix "/parc."

In some embodiments, some routers may include multiple NP-FIB entries for a given name prefix. For example, router 124 may include an NP-FIB entry that designates router 114 as the next-hop neighbor for anchor 106, and may include another NP-FIB entry that designates anchor 118 as a next-hop neighbor toward anchor 116.

CCN Interests typically do not include a name or identifier of a client that created and disseminated the Interest. Hence, when a gateway router receives an Interest from a client device, the gateway router can assign a local default AID value to any new Interest that the gateway router receives from a client device. For example, a client 128 can be coupled to gateway router 124. Gateway router 124 can assign a default AID value of 2020 to any Interest received from client 128 (or from any other client), and can perform a lookup operation in the NP-FIB (e.g., based on the Interest's name) to identify an interface to a next-hop neighbor that can forward the Interest.

Gateway router 124 may then update a local ART to create an entry that maps the AID to the next-hop interface. Also, gateway router 124 can determine which Content Objects are directed to itself when gateway router 124 receives a Content Object with its default AID value (e.g., default AID value 2020 for router 124), and proceeds to return the Content Object to client 128 instead of routing the Content Object to another router.

In some embodiments, gateway router 124 can also insert a distance value to the Interest along with the AID. For example, when router 124 receives the Interest from client 128, router 124 can obtain the expected distance to anchor router 116 from the FIB (along with the local interface toward anchor router 116). Then, other routers that forward the Interest can decrement the distance value in the Interest prior to forwarding the Interest toward an anchor router.

Recall that the AID values are local to neighboring nodes. In some embodiments, it may be possible for collisions to occur between AID identifiers when a router receives Interests with the same AID from two different neighboring routers. For example, router 118 may receive Interests with the same AID from routers 113 and 124. To handle these collisions, router 118 can choose an unused AID value for the Interest, and can map the new AID value to the Interest's original AID value in the ART. Router 118 can create an ART entry that specifies an "AID" field for the Interest's original AID value, and an "AID-map" field for the new AID value.

Once router 118 creates the ART entry (if the ART entry doesn't exist), router 118 can perform a bijective function (e.g., a two-way function) on the Interest's local AID value before forwarding the Interest to the next-hop router. For example, each router may have a set of AID values that it can accept, such that neighboring nodes may or may not have overlapping AID values. The bijective function may map an AID value from one router's set to a corresponding AID value in the next-hop router's set. Router 118 can replace an Interest's AID value with the next-hop router's AID value before forwarding the Interest to next-hop router 116, which happens to be an anchor for the CCN collection "/parc."

In some embodiments, the routers across CCN 100 can implement a loop-free forwarding rule (LFR) to avoid forwarding Interests in loops. For example, a router i may accept an Interest I[n(j), AID$^I$(k), D$^I$(k)] from router k if:

$$\exists v \in S^i_{n(j)} * (D^I(k) > D(i, n(j)^*, v)) \tag{1}$$

Equation (1) provides an exemplary LFR that may be used by router i at runtime. In equation (1), $S^i_{n(j)}$ denotes a set of next-hop neighbors of router i for a name prefix n(j)*, $D^I(k)$ denotes the distance specified in an Interest from router k, and D(i, n(j)*, v) denotes a distance stored by a neighbor v of router i for the name prefix n(j)*.

Once anchor router 116 receives the Content Object, the router can obtain the ART entry using the Content Object's AID, and can perform the bijective function on the ART entry's AID-map value. Router 116 then inserts the resulting AID value from the reverse-bijective function into the Content Object before returning the Content Object to router 118. Router 118 also performs the lookup operation in the local ART, and updates the Content Object's AID (by performing the reverse-bijective function) before forwarding the Content Object to gateway router 124.

In some embodiments, replacing the CCN pending Interest table (PIT) with the ART provides storage and runtime improvements when establishing return paths. The ART can have an expected size that is in the order of the number of routes that traverse the router, regardless of the number of Interests that may be pending along those routes. So for example, when router 124 sends any Interest along the path to router 118, these Interests will have the same AID (e.g., 2020). In contrast, the PIT would need to store a number of entries in the order of the number of the Interests that traverse the router, given that the PIT would need to store an entry for each pending Interest that has not timed out (a per-Interest state).

Moreover, performing a lookup operation in the ART can be faster than performing a lookup operation in a CCN PIT, given that the ART is substantially smaller than the PIT, and because searching the ART may not need a longest-prefix matching lookup operation. The ART does not store a name or name prefix, which allows a router to find an entry based on a single value (e.g., the AID) without having to perform a longest-matching prefix lookup operation.

Forwarding Interests

Figure 2:
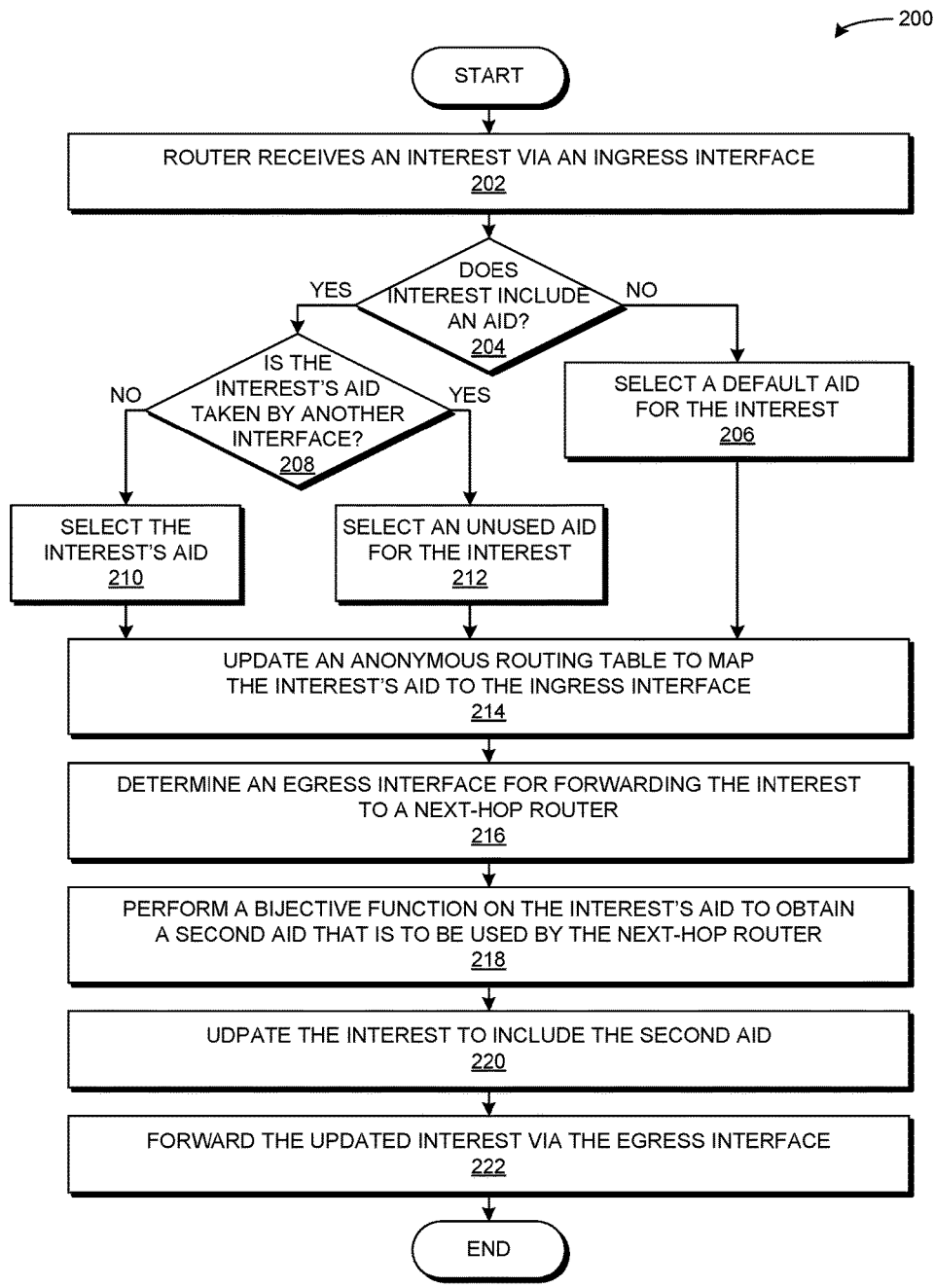
FIG. 2 presents a flow chart illustrating a method for selecting an anonymous identifier for an Interest while forwarding the Interest in a content-centric network in accordance with an embodiment.

FIG. 2 presents a flow chart illustrating a method 200 for selecting an anonymous identifier for an Interest while forwarding the Interest in a content-centric network in accordance with an embodiment. During operation, the router can receive an Interest via an ingress interface (operation 202), and determines whether the Interest includes an AID (operation 204). If the Interest does not include an AID, the router can select a default AID for the Interest (operation 206).

Otherwise, if the Interest does specify an AID, the router determines whether the Interest's AID is already associated with a local interface different than the Interest's ingress interface (operation 208). If the AID is not taken, the router selects the AID specified in the Interest (operation 210); otherwise, the router can select an unused AID for the Interest (operation 212). Once the router selects an AID for the incoming Interest, the router may then update an anonymous routing table (ART) to include an ART entry that maps the selected AID to the ingress interface, if the ART entry does not already exist (operation 214).

The router may then select an egress interface for forwarding the Interest to a next-hop router, such as by performing a lookup operation in a FIB, an NP-FIB, or an A-FIB (operation 216). The router may perform a bijective function on the Interest's AID to obtain a second AID that is to be used by the next-hop router (operation 218), and updates the Interest to include the second AID (operation 220). The router may then forward the Interest to the next-hop router via the egress interface (operation 222).

Bijection Function

When a local router selects a next-hop router for forwarding the Interest, the router can select an anonymous identifier (AID) that the next-hop router is to use for the Interest. In some embodiments, the local router can use a bijective function to map a local AID for the Interest to the next-hop AID that is to be used by the next-hop router. One possible implementation of this bijective function can be realized by having each router provide a Local interval of Identifiers (LI) list to its neighbors, which specifies the AIDs accepted by the router. Then, to perform the bijection, a local router can determine an index to the local AID in the local router's LI, and uses the index to perform a lookup operation in its neighbor's LI to obtain the neighbor's AID for the Interest. Hence, the LI lists provides an effective way of controlling which AIDs can be used locally by each router, and provide a one-to-one AID mapping between neighboring routers.

If each LI list has a set of sequential numbers, the bijection numbers can be computed by a router s using the equation:

$$AID_B = \alpha + (AID_A - LI_A(s)) + (LI_B(s) \bmod |LI|) \tag{2}$$

Equation (2) includes simple mathematical operations that can be computed quickly by a processor's arithmetic unit. The value $AID_A$ corresponds to the Interest's AID (which is a member of the local node's LI list). The value ($AID_A - LI_A(s)$) provides the index of $AID_A$ in $LI_A$ (e.g., the offset from the starting value $LI_A(s)$ in $LI_A$), and the value ($LI_B(s)$ mod |LI|) provides the starting value of $LI_B(s)$.

Hereinafter, the notation $f_i(n)$ denotes the bijective mapping performed by router i, using an LI list from neighbor n $LI^i(n)$, in the forward direction from $LI^i(i)$ to $LI^i(n)$. Also, the notation $f_i^{-1}(n)$ denotes the bijective function performed by router i in the reverse direction using the LI list from neighbor n. The bijective functions and reverse bijective functions are two-way functions, which allows: $f_i^{-1}(n)[f(n)[a]]=a$. Also, in some embodiments, neighboring nodes can reverse a bijective function when returning a data packet: $f_n(i)[f_i(n)[a]]=a$.

In some embodiments, neighboring routers can exchange LI lists with their neighbors in the data plane using Interests and data packets, or in the control plane as part of the routing protocol. For example, the neighboring routers can exchange LI lists in HELLO messages, link-state advertisements, or distance updates.

Table 1 provides an exemplary algorithm for processing an Interest from a consumer c at a router i, and Table 2 provides an exemplary algorithm for processing an Interest from a router p at a router i. In Tables 1 and 2, and hereinafter, the notation n(j) represents a name prefix, and $D^I(p)$ represents a distance specified in the Interest from router p. $AID^I(p)$ represents an AID for an Interest from router p (which router p computed using the bijection function $f_p(s)$ for neighbor s), and $AID^R(i)$ represents an AID for a return packet from router i (which router i computed using the reverse-direction bijection function $f_i^{-1}(s)$ for neighbor s).

Based on these notations, the notation $I[n(j), AID^I(p), D^I(p)]$ represents an Interest from router p, such that the Interest specifies a name prefix n(j), an Interest AID with value $AID^I(p)$, and a distance $D^I(p)$. Similarly, the notation $DP[n(j), AID^R(i), sp(j)]$ represents a data packet being returned by router p (e.g., a Content Object), such that the data packet specifies a name prefix n(j) (or a CCN name that includes prefix n(j)), a response AID with value $AID^R(i)$, and a payload sp(j) that corresponds to name prefix n(j).

In some embodiments, the router may need to return a negative acknowledgement (NACK) when the router may not be able to forward the Interest, or may not be able to receive a response data packet. The notation $NA[n(j), AID^R(i), CODE]$ represents NACK from router i, such that the NACK specifies a name prefix $n(j)$, a response AID with value $AID^R(i)$, and a NACK code or message that states a reason for the NACK response. For example, a router may return a NACK response when the router detects an Interest loop, when a route to a name prefix $n(j)$ or a corresponding anchor is not found, or when the requested content is not found by the content producer.

The CCN routers may maintain a set of data structures that facilitate forwarding Interests and/or Content Objects based on AID values. Specifically, router i may include at least a $LIGHT^i$, a LISTi, a $FIB^i$, and an $ART^i$ data structure.

The notation $LIGHT^i$ stands for Local Interests Gathered Table, and denotes a set of names of the Content Objects (COs) that router i has requested (e.g., pending Interests), or has stored (e.g., cached COs). $LIGHT^i$ may take a name prefix $n(j)$ as input (e.g., as the index), and each $LIGHT^i$ entry can include a CO name $n(j)$, a pointer to the content of the CO $(p[n(j)])$, and a local consumer list $lc[n(j)]$. The notation $lc[n(j)]$ denotes a list of local consumers with pending Interests for the name prefix $n(j)$.

The notation $LIST^i$ stands for Local Interval Set Table, and denotes a set (e.g., a sequential interval) of anonymous identifiers (AIDs) used by router i. For each neighbor k, $LIST^i$ states the local interval of identifiers accepted by router k $(LI^i(k))$, and the local interval of identifiers accepted by router i $(LI^i(i))$. Given that neighboring routers exchange LI lists with each other, $LI^i(k)=LI^k(k)$. In some embodiments, all local intervals have the same length, $|LI|$. The notation $map(ART^i)$ denotes an AID mapping in the ART of router i, which router i may use to identify potential AID collisions.

$FIB^i$ denotes a forwarding information base at router i (e.g., a CCN FIB, an NP-FIB, and/or an A-FIB), and $ART^i$ denotes an anonymous routing table at router i (e.g., a unicast ART, or a multicast ART). The $FIB^i$ entries specify a distance reported by each next-hop neighbor for a given name prefix. The notation $D(i, n(j)^*, s)$ denotes a distance stored by a neighbor s of router i for the name prefix $n(j)^*$. In some embodiments, router i stores each entry in the $FIB^i$ for at most a time duration determined by a lifetime of the corresponding entry in the routing table of router i. $ART^i$ may take an anonymous identifier as input (e.g., as the index), which is a member of $LI^i(i)$. Each $ART^i$ entry $ART^i[AID, s, map]$ may specify an $AID(ART^i) \in LI^i(i)$, an interface to a next hop neighbor s toward the destination, and an identifier mapping $map(ART^i) \in LI^i(i)$ which router i may use to handle identifier collisions.

TABLE 1

```
function Interest_Source
INPUT: LIGHT^i, LIST^i, FIB^i, ART^i, AID^i, I[n(j), c, nil];
if n(j) ∈ LIGHT^i then
    if p[(n(j)] ≠ nil then
        retrieve CO n(j);
        send DP[n(j), c, sp(j)] to consumer c;
    else
        p[n(j)] = nil;
        lc[n(j)] = lc[n(j)] ∪ c;          (Interest is aggregated)
    end if
else
    if n(j)* ∈ LIGHT^i then
        send NA[n(j), c, no content];     (n(j) does not exist)
    else
```

TABLE 1-continued

```
        if n(j)* ∉ FIB^i then
            send NA[n(j), no route, c] to c; (No route to n(j)* exists)
        else
            create entry for n(j) in LIGHT^i; (Interest from c is recorded);
            lc[n(j)] = lc[n(j)] ∪ c;
            p[n(j)] = nil;
            for each v ∈ N^i by rank in FIB^i do
                if AID^i = nil then
                    SET = Ø;
                    for each entry ART^i[AID, v, map] do
                        SET = SET ∪ {AID};
                    end for
                    select a ∈ LI^i(i) − SET;
                    AID^i = a;
                    create entry ART^i[AID^i, i AID^i]
                end if
                AID^I(i) = f_i(v)[AID^i];
                D^I(i) =D(i, n(j)*, v);
                send I[n(j), AID^I(i), D^I(i)] to v;
                return;
            end for
        end if
    end if
end if
```

TABLE 2

```
function forwarding
INPUT: LIGHT^i, LIST^i, FIB^i, ART^i, I[n(j), AID^I(p), D^I(p)];
AID^R(i) = AID^I(p);
if n(j) ∈ LIGHT^i then
    if p[(n(j)] ≠ nil then
        retrieve CO n(j); send DP[n(j), AID^R(i), sp(j)] to router p;
    end if
else
    if n(j)* ∈ LIGHT then
        send NA[n(j), AID^R(i), no content] to p;   (n(j) does not exist)
    else
        if n(j)* ∉ FIB^i then
            send NA[n(j), AIDR(i), no route] to p;   (No route to n(j)* exists)
        else
            for each s ∈ N^i by rank in FIB^i do
                if D^I(p) > D(i, n(j)*, s) then          (LFR is satisfied)
                    SET = Ø; AID^I(i) = nil; collision = 0;
                    for each entry ART^i[AID, s, map] do
                        SET = SET ∪ {AID};
                        if AID(ART^i) = AID^I(p) then
                            if s(ART^i) = p then
                                AID^I(i) = f(s)[AID(ART^i)];
                            else
                                collision = 1;
                            end if
                        end if
                        if map(ART^i) = AID^I(p) and s(ART^i) = p then
                            AID^I(i) = f(s)[AID(ART^i)];
                        end if
                    end for
                    if collision = 0 and AID^I(i) = nil then
                        create entry ART^i[AID^I(p), p, AID^I(p)]; AID^I(f_i(s)[AID^I(p)];
                    end if
                    if collision = 1 and AID^I(i) = nil then
                        select a ∈ LI^i(i) − SET;
                        create entry ART^i[a, p, AID^i(p)]; AID^I(i) = f_i(v)[a];
                    end if
                    D^I(i)=D(i, n(j)*, s); send I[n(j), AID^I(i), D^I(i)] to s;
                    return;
                end if
            end for     (LFR is not satisfied; Interest may be traversing a loop)
            send NA[n(j), AID^R(i), loop] to p;
        end if
    end if
end if
```

Forwarding Content Objects

Figure 3:
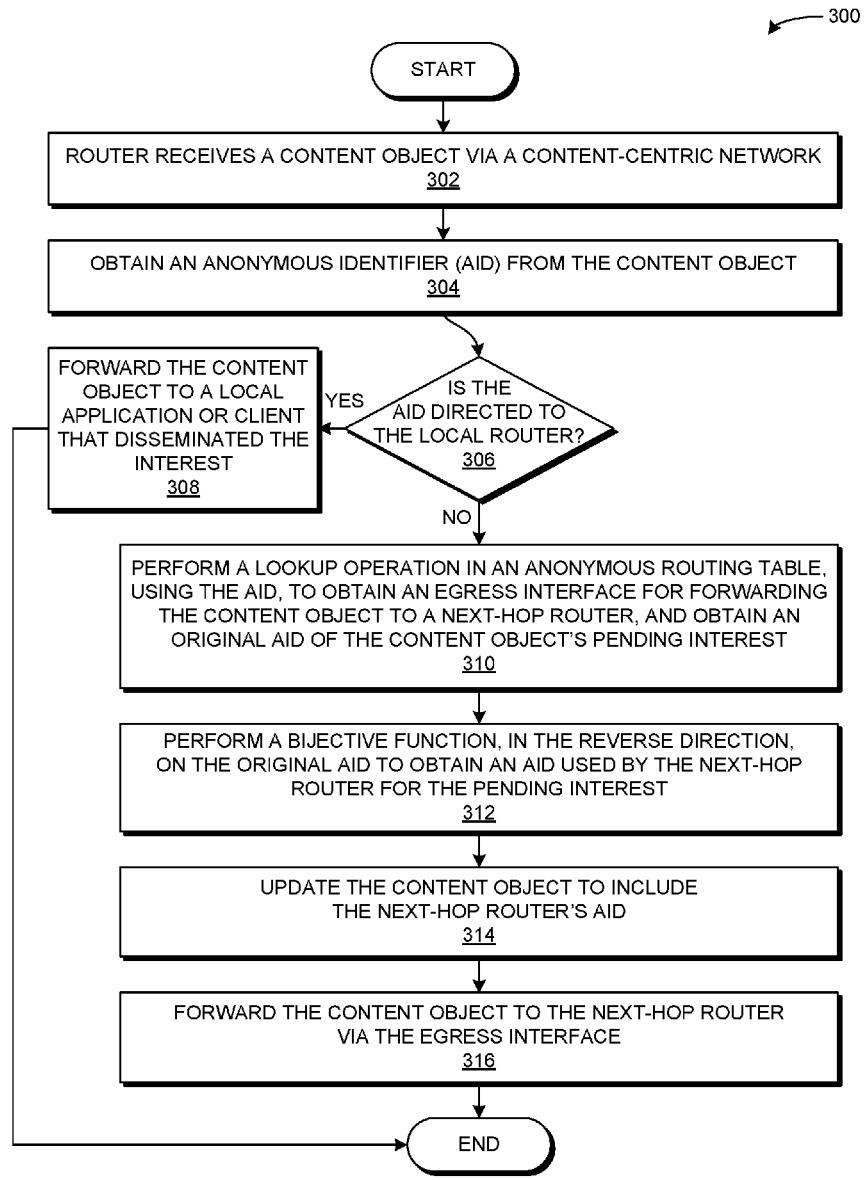
FIG. 3 presents a flow chart illustrating a method for forwarding a Content Object based on an AID associated with one or more pending Interests in accordance with an embodiment.

FIG. 3 presents a flow chart illustrating a method for forwarding a Content Object based on an AID associated with one or more pending Interests in accordance with an embodiment. During operation, the router can receive a Content Object via CCN (operation 302), and obtains an AID from the Content Object (operation 304). The router may then determine if the AID is directed to the local router, such as by determining whether the AID matches the local router's default AID value (operation 306). If so, the router is a gateway for a local application or a client device from where the Interest originated, and can proceed to forward the Content Object to the local application or client device (operation 308).

However, if the AID is not directed to the local router, the router can perform a lookup operation in an ART, using the AID as input, to obtain an egress interface for forwarding the Content Object to a next-hop router, and to obtain an original AID of the Content Object's pending Interest (operation 310). The router may then perform a bijective function, in the reverse direction, on the original AID to obtain the AID which the next-hop router used for its pending Interest (operation 312). The router then updates the Content Object to include the next-hop router's AID (operation 314), and forwards the Content Object to the next-hop router via the egress interface (operation 316).

Figures 4A, 4B:
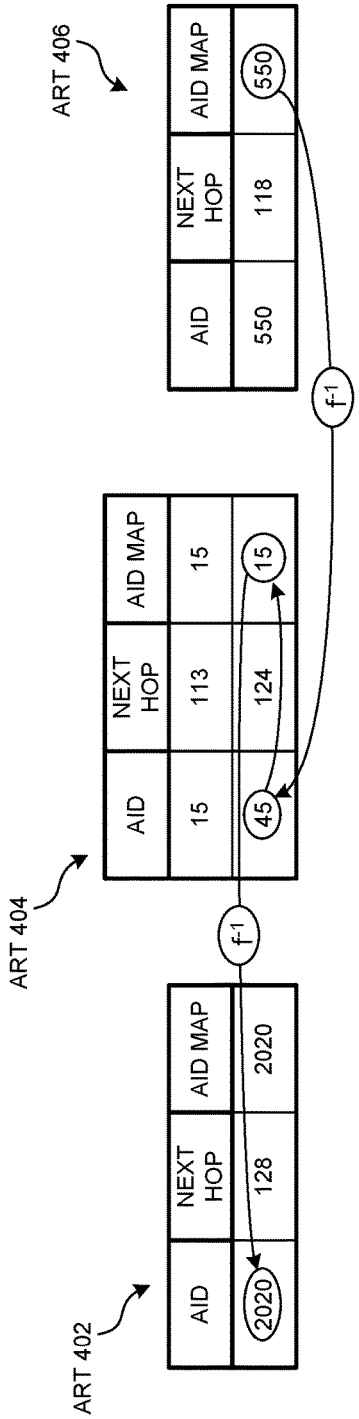
FIG. 4A illustrates exemplary anonymous routing tables (ARTs) in accordance with an embodiment.
FIG. 4B illustrates exemplary multicast anonymous routing tables (MARTs) in accordance with an embodiment.

FIG. 4A illustrates exemplary anonymous routing tables (ARTs) in accordance with an embodiment. ART 402 can correspond to router 124 of CCN 100 (FIG. 1), ART 404 can correspond to router 118 of CCN 100, and ART 406 can correspond to router 116 of CCN 100. When router 124 receives an Interest from client 128, router 124 can assign the default AID 2020 to the Interest, and creates an ART entry that maps AID 2020 to client 128.

Router 124 then performs a bijective function on AID 2020 to obtain AID 15 for router 118, and sends the Interest to router 118 using AID 15. However, if router 118 already has an entry with the AID value 15, router 118 may create a new entry in ART 404 that maps a new AID value 45 to router 124 and to AID 15. Router 118 then performs the bijective function on AID 45 to obtain an AID value 550 for router 116, and forwards the Interest to router 116 using AID value 550. Router 116 creates a new entry in ART 406 that maps AID 550 to router 118.

Once router 116 receives a Content Object for the Interest, router performs the bijective function on AID 550 (from the "AID MAP" field), in the reverse direction, to return the Content Object using AID value 45. Then, router 118 performs a lookup operation in ART 404 using AID 45 to identify router 124 as the next-hop router, and to obtain AID value 15. Router 118 also performs the bijective function, in the reverse direction, on AID value 15 to forward the Content Object to router 124 using the AID value 2020.

Table 3 presents an algorithm implemented by a router to return a data packet, and Table 4 presents an algorithm implemented by the router to return a NACK.

TABLE 3 function Data Packet
INPUT: $LIGHT^i$, $LIST^i$, $ART^i$, DP[n(j), $AID^R$(p), sp(j)];
verify sp(j);
if verification of sp(j) fails then
   discard DP[n(j), $AID^R$(s), sp(j)];
end if
a = $f_i^{-1}$(s)[$AID^R$(s)];
retrieve entry $ART^i$[a, p, m];
if $ART^i$[a, p, m] does not exist then
   drop DP[n(j), AIDR(s), sp(j)];
end if
if p=i then
   for each c ∈ lc[n(j)] do
     send DP[n(j), c, sp(j)] to c;

TABLE 3-continued lc[n(j)] = lc[n(j)] − {c};
   end for
else
   if p ∈ $N^i$ then
     $AID^R$(i) = m;
     send DP[n(j), $AID^R$(i), sp(j)] to p;
   end if
end if
if no entry for n(j) exists in $LIGHT^i$ then
   create $LIGHT^i$ entry for n(j): lc[n(j)] = ∅;
end if
store CO in local storage;
p[n(j)] = address of CO in local storage;

TABLE 4 function NACK
INPUT: $LIGHT^i$, $LIST^i$, $ART^i$, NA[n(j), $AID^R$(s), CODE];
a = $f_i^{-1}$(s)[$AID^R$(s)];
retrieve entry $ART^i$[a, p, m];
if $ART^i$[a, p, m] does not exist then
   drop NA[n(j), $AID^R$(s), CODE];
end if
if p=i then
   for each c ∈ lc[n(j)] do
     send NA[n(j), c, CODE] to c;
   end for
   delete entry for n(j) in $LIGHT^i$;
else
   if p ∈ $N^i$ then
     $AID^R$(i) = m;
     send NA[n(j), $AID^R$(i), CODE] to p;
   end if
end if Multicast Anonymous Routing Table In CCN, when clients disseminate Interests for a multicast stream, these Interests create return paths by creating entries in the PITs along CCN routers toward the multicast source. These return paths form a multicast tree traversed by the multicast packets. However, because ARTs keep track of paths to clients and don't keep track of Interests, a basic ART may not be able to keep track of the recipients in a multicast tree.

In some embodiments, routers can use a multicast anonymous routing table (MART) to provide support for multicast packets, without having to store per-Interest forwarding state along the routers in a multicast tree. The MART maintains a per-group forwarding state, unlike the ART which maintains a per-path forwarding state, and unlike a PIT that maintains a per-Interest forwarding state. When a neighbor forwards an Interest associated with a multicast group to a router, the router can add the neighbor to the list of next-hop neighbors that have joined the multicast group. If two neighbors use the same multicast AID, the router can aggregate these neighbors in the next-hop list of the same multicast group in the MART.

For example, in some embodiments, the MART may not need to store state information for the content being transmitted along the multicast tree. Also, similar to the ART, the MART does not need to store a per-Interest forwarding state. If a neighbor forwards another Interest directed to the same multicast group to the same router, the router may not need to create a new entry for the multicast group, even if the name associated with the Interest is directed to different content (e.g., even if the name has a different name prefix).

On the other hand, if two neighbors use a different multicast AID for the multicast group, the router may create a separate MART entry for each new multicast AID and multicast-group name combination. These MART entries across CCN routers create a multicast forwarding tree (MFT) for a given multicast-group's name along the CCN routers. Because of this, the size of the MART can grow proportionally to the number of gateway routers that join the multicast group, and not based on the number of Interests that have been disseminated for a name prefix associated with the multicast group.

In some embodiments, the identity function used to obtain a multicast AID for a multicast group is a type of bijective function (e.g., has a one-to-one mapping). For example, a router can forward multicast Interests using a process similar to how unicast Interests are forwarded. However, when performing the bijective function on a multicast AID, the router can use a multicast identifier (MI) list instead of the LI list. Also, multicast routing allows collisions to occur between multicast AIDs for the same multicast group, so the MART may not need to map an Interest's AID to a different locally-unique AID.

The router can maintain a local MI list, and may share the MI list with its neighbors. When the router or its neighbors perform the bijective function to determine the multicast AID for the next-hop router, they may select a multicast AID associated with the multicast group in the MI list. This way, if multiple nodes are forwarding an Interest for the same multicast group to the same router, these neighbors can use the router's MI list to select the same multicast AID to assign to the multicast Interest before forwarding the Interest to the router.

CCN traditionally implements a pull technique, where clients need to disseminate an Interest for each Content Object they receive, both for unicast and multicast streams. However, push content dissemination can provide advantages for multicast streams. In some embodiments, the MART can include a field for a multicast counter (mc) that routers can use to support both push and pull content dissemination.

Routers can use the mc field to implement push dissemination by increasing the value of the mc counter after they forward each Content Object in a stream's sequence across the MFT. For example, a gateway router can support push-based multicast routing by forwarding a multicast Interest that includes an initial mc value to establish a path to a multicast content producer. Then, the content producer can push a sequence of NDN messages along the multicast tree, without the client having to disseminate additional Interests. In some embodiments, a router in the MFT can remove the MART entry if the MFT times out (e.g., if a message is not forwarded across the multicast tree for a predetermined time interval).

It's far easier to keep an mc counter than it is to keep per-Interest entries in the MART. The mc counter indicates a sequence identifier of the next message that the clients are to receive, and routers may not need to remove the corresponding MART entry after a message is forwarded across the MFT. The content producer can return each Content Object, one at a time, with the corresponding mc counter in the Content Object. As each router in the MFT receives the next message, the router can perform a lookup in the MART based on the group name, the multicast AID, and the mc counter to obtain the list of next-hop routers. The router can then increment the mc counter in the MART entry when the router forwards the Content Object to the next-hop routers along the MFT. For example, the multicast data packet (e.g., a Content Object) can have the following data structure: DP[g(j), $AID^R(i)$, sp(j), $mc^R(i)$, payload], where g(j) states a name of a multicast group, $AID^R(i) \in MIi(i)$, sp(j) represents a security payload for the multicast group, and $mc^R(i)$ represents the multicast counter for the return data packet (e.g., a Content Object payload, or a NACK code).

CCN clients and routers can also specify an mc field in multicast Interests to implement pull-based dissemination by allowing clients to use the mc counter to implement a source-pacing algorithm. Different clients can start a stream at different times, or can request stream packets at different rates, by specifying an mc counter in the multicast Interest for each Content Object in the multicast stream. The clients can increase the value of the mc counter for each additional multicast Interest that they disseminate over CCN, and the CCN routers may then create a new MART entry for each unique mc counter value that is pending for the multicast group. For example, if clients are disseminating their multicast Interests for the same multicast group at varying rates, the CCN routers may group the paths directed to the same mc value in a single MART entry, and may create an additional MART entry for each other mc counter value pending for the multicast group.

FIG. 4B illustrates an exemplary multicast anonymous routing table (MART) 450 in accordance with an embodiment. MART 450 includes three entries for a multicast group "/parc." MART 450 may correspond to router 118 of CCN 100 (FIG. 1), which may have an MFT established with routers 112, 113, and 124 for a first multicast stream (with AID value 5) from anchor 116 (e.g., for the name prefix "/parc"), and may have another MFT established with router 124 for a second multicast stream (with AID value 8) from anchor 116.

The first MART entry corresponds to a third packet in the multicast stream with AID value 5, and the second MART entry corresponds to a second packet in the multicast stream. For example, the first MART entry may correspond to the multicast stream being pushed to routers 113 and 124, such that router 118 may increment the mc counter from 3 to 4 after receiving and forwarding the third Content Object of the multicast stream. The second MART, on the other hand, may correspond to a pull request, which may have occurred if a client disseminated a multicast Interest with the mc value 2 to request the second Content Object in the multicast stream.

The third MART entry in MART 450 may correspond to a second packet in the second multicast stream with ID value 5, which includes router 124 in the MFT.

Name-Prefix FIB and Anchor FIB

Recall that the CCN routers can use a forwarding information base (FIB) to determine an egress interface via which to forward an Interest. In a typical content centric network, the router would need to perform a longest-prefix matching lookup in the FIB, using the Interest's name, to determine an interface associated with the longest matching prefix. However, the FIBs are undesirably large, and performing a lookup in a typical FIB can be undesirably slow.

For example, an Internet protocol (IP) FIB can have a size in the order of millions of FIB entries ($O(10^6)$), and a typical CCN FIB can have a size in the order of billions of FIB entries ($O(10^9)$). A relatively small table can easily be made faster by implementing the table using a parallel-search architecture, such as in an application-specific integrated circuit (ASIC) or in a general purpose graphics processing unit (GPGPU). However, a larger table with billions of entries may require an optimization trade-off between (money, size, energy) vs. speed.

Embodiments of the present invention avoid having to optimize a conventional CCN FIB by replacing the CCN FIB with two smaller FIBs: a name-prefix FIB (NP-FIB) for mapping a CCN name prefix to a nearest anchor node, and an anchor FIB (A-FIB) for mapping an anchor's identifier to a local interface or next-hop neighbor via which the anchor can be reached. The NP-FIB and A-FIB can provide optimizations across CCN nodes that perform most of the Interest forwarding.

The gateway routers that receive Interests from client devices can perform a longest-prefix matching lookup on the NP-FIB to determine the nearest anchor associated with an Interest's name prefix, and insert the anchor's identifier in the Interest. The other routers across CCN can perform a faster exact-match lookup in the smaller A-FIB to forward the Interest toward a specific anchor, regardless of the data collection being requested from the anchor. The routers can perform the exact-match lookup in the A-FIB, using the Interest's anchor identifier, to determine the local interface (to a next-hop router) via which the router can forward the Interest toward the anchor.

In some embodiments, the A-FIB is sufficiently small to store in a small memory, and to implement a parallel lookup operation in a hardware (e.g., ASIC) implementation of the lookup table. In some embodiments, the A-FIB lookup table is sufficiently small to be searched quickly by a single CPU core, and can be further improved by dividing the lookup process across multiple cores of a CPU or GPU.

The routers can dynamically bind a CCN name to an interface toward an anchor, regardless of the routing protocol used in name-based routing. For example, each router can maintain a routing table with entries that specify an anchor identifier, a distance, a next-hop interface, and a sequence number. Each router can use the anchor identifier and sequence number in the routing table to establish loop freedom in the control plane. The router may then populate the NP-FIB and A-FIB based on the routing table, and can use the distance value in the NP-FIB entries and the A-FIB entries to maintain loop freedom in the data plane.

In some embodiments, an NP-FIB entry can include a name prefix field, an anchor identifier field, a distance field that specifies a distance to the anchor, and a next-hop field that specifies an interface to a next-hop router toward the anchor. The anchor identifier in the NP-FIB can be any unique identifier for the router that announced or advertised the presence of the name prefix. Moreover, an A-FIB entry can include an anchor identifier, a next-hop field that indicates an interface to a next-hop router toward the anchor, and a distance field that specifies a distance to the anchor.

Given that the locations of data collections are oftentimes static, the binding decisions made by the routers may typically be stable. Also, the bindings at network nodes that route packets to one replica of a collection (e.g., to anchor 106 of CCN 100 in FIG. 1) are typically independent of the bindings at network nodes that route packets to another replica of the same collection (e.g., to anchor 116). For example, the binding decisions at nodes between router 124 and 116 are made with respect to how to forward Interests associated with the name prefix "/parc" to anchor 116, even though anchor 106 or another anchors for the same name prefix may exist throughout CCN 100.

FIG. 5A illustrates exemplary name-prefix forwarding information base (NP-FIB) table 502 in accordance with an embodiment. NP-FIB 502 can correspond to gateway router 124 of CCN 100 (FIG. 1), and can include a name prefix field, an anchor field that specifies an anchor's identifier, a distance field that specifies a distance to the anchor, and a next-hop field which specifies an interface via which the anchor can be reached. Specifically, NP-FIB 502 can include six entries, which specify next-hop routers to anchor 106 for the name prefixes "/parc" and "/alpha", and specify next-hop routers to anchor 116 for the name prefixes "/parc" and "/beta."

FIG. 5B illustrates exemplary anchor forwarding information base (A-FIB) tables 552, 554, and 556 in accordance with an embodiment. A-FIBs 552, 554, and 556 may correspond to routers along a path between gateway router 124 and anchor 116 of CCN 100, and each can include entries with an anchor field, a next-hop field, and a distance field. Specifically, the A-FIB 552 may correspond to gateway router 124, A-FIB 554 may correspond to router 118, and A-FIB 554 may correspond to anchor 116. The number of entries in A-FIBs 552, 554, and 556 are smaller than those of an NP-FIB, given that the A-FIBs map anchors to a next-hop neighbor, regardless of the content (name prefix) being requested from the anchor.

Figure 6:
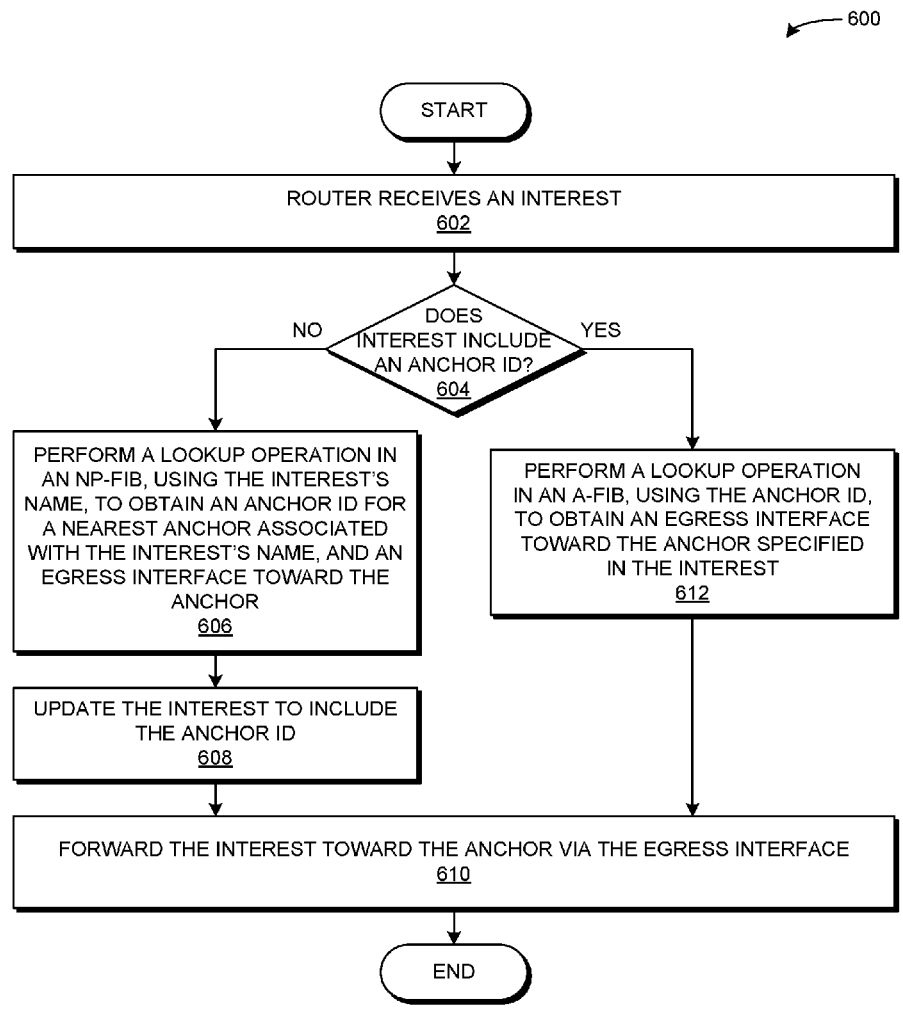
FIG. 6 presents a flow chart illustrating a method for determining an egress interface for forwarding an Interest based on an anchor's identifier in accordance with an embodiment.

FIG. 6 presents a flow chart illustrating a method 600 for determining an egress interface for forwarding an Interest based on an anchor's identifier in accordance with an embodiment. During operation, the router can receive an Interest (operation 602), and can determine whether the Interest includes an anchor identifier (operation 604). If so, the router can perform a lookup operation in an A-FIB (e.g., an exact-match lookup), using the anchor identifier, to obtain an egress interface toward the anchor specified in the Interest (operation 612). The router then forwards the Interest toward the anchor via the egress interface (operation 610).

However, if the Interest does not include an anchor identifier, the router can perform a lookup operation in an NP-FIB (e.g., a longest-matching prefix lookup), using the Interest's name, to obtain an anchor identifier associated with the Interest's name, and to obtain an egress interface toward the anchor (operation 606). The router also updates the Interest to include the anchor identifier (operation 608), and proceeds to operation 610 to forward the updated Interest toward the anchor via the egress interface.

Figure 7:
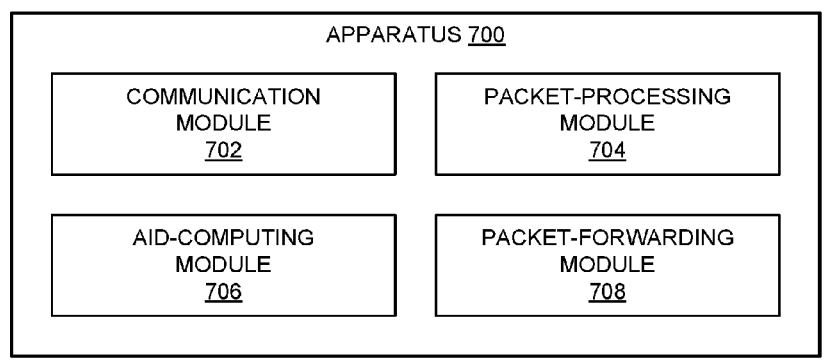
FIG. 7 illustrates an exemplary apparatus that facilitates forwarding Interests and Content Objects based on anonymous datagrams in accordance with an embodiment.

FIG. 7 illustrates an exemplary apparatus 700 that facilitates forwarding Interests and Content Objects based on anonymous datagrams in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a packet-processing module 704, an AID-computing module 706, and a packet-forwarding module 708.

In some embodiments, communication module 702 can receive an Interest or a data packet. Packet-processing module 704 can obtain a name or an AID from the Interest or data packet.

AID-computing module 706 can compute an AID that is to be used by a next-hop neighbor, from the previous AID associated with the Interest or data packet and a bijective function. Packet-forwarding module 708 can update the Interest or data packet to include the new AID before forwarding the Interest or data packet to the next-hop neighbor.

Figure 8:
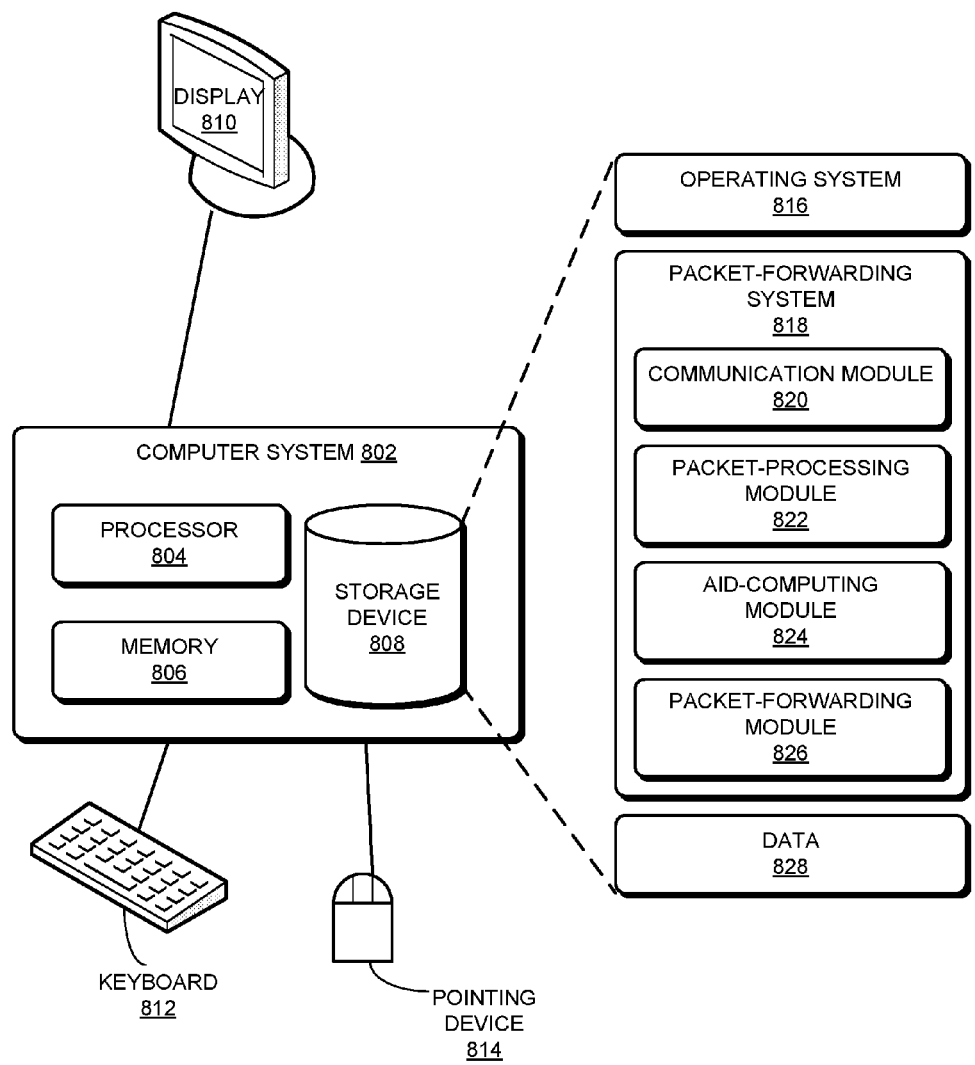
FIG. 8 illustrates an exemplary computer system that facilitates forwarding Interests and Content Objects based on anonymous datagrams in accordance with an embodiment.

FIG. 8 illustrates an exemplary computer system 802 that facilitates forwarding Interests and Content Objects based on anonymous datagrams in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, packet-forwarding system 818, and data 828.

Packet-forwarding system 818 can include instructions, which when executed by computer system 802, can cause computer system 802 to perform methods and/or processes described in this disclosure. Specifically, packet-forwarding system 818 may include instructions for receiving an Interest or a data packet (communication module 820), and can include instructions for obtaining a name or an AID from the Interest or data packet (packet-processing module 822).

Further, packet-forwarding system 818 can include instructions for computing an AID that is to be used by a next-hop neighbor, from the previous AID associated with the Interest or data packet and a bijective function (AID-computing module 824). Packet-forwarding system 818 can also include instructions for updating the Interest or data packet to include the new AID before forwarding the Interest or data packet to the next-hop neighbor (packet-forwarding module 826).

Data 828 can include any data that is required as input or that is generated as output by the methods and/or processes described in this disclosure. Specifically, data 828 can store at least a LIGHT data structure, a LIST data structure, a FIB data structure, and an ART data structure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising: receiving, by a router of an information-centric network, an Interest via a first interface of the router, the Interest including at least a name prefix for a requested piece of data; determining, for the Interest, a first anonymous identifier (AID) that identifies a name-independent path to the Interest's source via the router without revealing information about the source; performing, by the router, a lookup operation for the name prefix of the Interest in a name-prefix forwarding information base that maps name prefixes to interfaces toward a nearest anchor for a given name prefix; identifying a second interface for forwarding the Interest to a next-hop neighbor via the information-centric network, based on matching the name prefix of the Interest to the second interface during the lookup operation; performing a bijective function on the first AID to obtain a second AID that is to be used by the next-hop neighbor to establish a name-independent return path to the router without revealing information about the identity of the router; updating the Interest to include the second AID; and forwarding the Interest via the second interface toward the next-hop neighbor.

2. The method of claim 1, wherein determining the first AID involves:
responsive to determining that the Interest does not include an AID, selecting a default AID associated with the router as the first AID.

3. The method of claim 1, wherein determining the first AID involves obtaining an AID from the Interest.

4. The method of claim 3, wherein determining the first AID further involves:
in response to determining that the router has mapped the Interest's AID to a third interface different than the first interface, selecting, for the Interest, an AID that the router has not assigned to an interface different than the first interface.

5. The method of claim 1, further comprising:
updating an anonymous routing table (ART) to include an ART entry that maps the first AID to the first interface, if the ART entry does not exist in the ART.

6. The method of claim 4, wherein updating the ART further involves:
creating the ART entry so that the ART entry maps the first AID to an AID specified in the original Interest.

7. The method of claim 1, further comprising:
determining that the Interest corresponds to a multicast stream; and
updating a multicast anonymous routing table (MART) to include a MART entry that maps a group identifier and the AID to at least the first interface, if the mapping does not exist in the MART.

8. The method of claim 7, wherein the Interest includes a multicast counter which identifies a starting sequence number for the multicast stream; and
wherein updating the MART further comprises storing the multicast counter in the MART entry.

9. The method of claim 1, wherein performing the bijective function involves:
determining, from an ordered AID list corresponding to the next-hop neighbor, the second AID that corresponds to the first AID in a local ordered AID list for the router.

10. A non-transitory computer-readable storage medium storing instructions that when executed by a computer cause the computer to perform a method, the method comprising: receiving an Interest via a first interface of the router, the Interest including at least a name prefix for a requested piece of data; determining, for the Interest, a first anonymous identifier (AID) that identifies a name-independent path to the Interest's source via the router without revealing information about the source; performing, by the router, a lookup operation for the name prefix of the Interest in a name-prefix forwarding information base that maps name prefixes to interfaces toward a nearest anchor for a given name prefix; identifying a second interface for forwarding the Interest to a next-hop neighbor via the information-centric network, based on matching the name prefix of the Interest to the second interface during the lookup operation; performing a bijective function on the first AID to obtain a second AID that is to be used by the next-hop neighbor to establish a name-independent return path to the router without revealing information about the identity of the router; updating the Interest to include the second AID; and forwarding the Interest via the second interface toward the next-hop neighbor.

11. The storage medium of claim 10, wherein determining the first AID involves obtaining an AID from the Interest.

12. The storage medium of claim 10, further comprising: updating an anonymous routing table (ART) to include an ART entry that maps the first AID to the first interface, if the ART entry does not exist in the ART.

13. The storage medium of claim 10, further comprising: determining that the Interest corresponds to a multicast stream; and
updating a multicast anonymous routing table (MART) to include a MART entry that maps a group identifier and the AID to at least the first interface, if the mapping does not exist in the MART.

14. The storage medium of claim 10, wherein performing the bijective function involves:
determining, from an ordered AID list corresponding to the next-hop neighbor, the second AID that corresponds to the first AID in a local ordered AID list for the router.

15. A method, comprising: receiving, by a router of an information-centric network (ICN), an ICN data packet that includes a response to a pending Interest; obtaining a first anonymous identifier (AID) from the ICN data packet, wherein the first AID identifies a name-independent path to the Interest's source via the router without revealing information about the source; performing a lookup operation in an anonymous routing table (ART), based on the first AID, to determine an interface of the router for forwarding the ICN data packet toward the pending Interest's source; performing a reverse bijective function on the first AID to determine a second AID used by a next-hop neighbor for the pending Interest without revealing information about the identity of the router; updating the ICN data packet to include the second AID used by the next-hop neighbor for the pending Interest; and forwarding, by the router, the ICN data packet via the interface.

16. The method of claim 15, wherein updating the ICN data packet involves obtaining, from the ART, an ART entry that maps the first AID to an original AID of the pending Interest.

17. The method of claim 16, wherein updating the ICN data packet further involves:
performing a bijective function on the original AID to determine the first AID used by the next-hop neighbor for the pending Interest.

18. The method of claim 15, wherein the ART is a multicast anonymous routing table (MART) with a MART entry that maps the first AID and a multicast group identifier of the ICN data packet to one or more next-hop neighbors of a multicast tree that are to receive the ICN data packet.

19. The method of claim 18, wherein the MART entry includes a multicast counter which identifies a sequence number for a next ICN data packet that the next-hop neighbors are to receive via the multicast tree; and
wherein the method further comprises incrementing the multicast counter in the MART in response to forwarding the ICN data packet.

20. An apparatus, comprising: a processor; and a memory storing instructions that when executed by the processor cause the apparatus to implement: a communication circuit to receive an information-centric networking (ICN) data packet that includes a response to an Interest; a packet-processing circuit to obtain a first anonymous identifier (AID) from the ICN data packet, wherein the first AID identifies a name-independent path to the Interest's source via the router without revealing information about the source; and a packet-forwarding circuit to: perform a lookup operation in an anonymous routing table (ART), based on the first AID, to determine an interface of the router for forwarding the ICN data packet toward the Interest's source; perform a reverse bijective function on the first AID to determine a second AID used by a next-hop neighbor for the pending Interest without revealing information about the identity of the router; update the ICN data packet to include the second AID used by the next-hop neighbor for the pending Interest; and configure the communication circuit to forward the ICN data packet via the interface.

21. The apparatus of claim 20, wherein the packet forwarding circuit is configured to update the ICN data packet by obtaining, from the ART, an ART entry that maps the first AID to an original AID of the pending Interest.

22. The apparatus of claim 20, wherein the ART is a multicast anonymous routing table (MART) with a MART entry that maps the first AID and a multicast group identifier of the ICN data packet to one or more next-hop neighbors of a multicast tree that are to receive the ICN data packet.

23. The apparatus of claim 22, wherein the MART entry includes a multicast counter which identifies a sequence number for a next ICN data packet that the next-hop neighbors are to receive via the multicast tree; and
wherein the packet-forwarding circuit is configured to increment the multicast counter in the MART in response to forwarding the ICN data packet.

* * * * *